(12) United States Patent
Stafford et al.

(10) Patent No.: US 11,501,000 B2
(45) Date of Patent: *Nov. 15, 2022

(54) AUTO-INJECTION OF SECURITY PROTOCOLS

(71) Applicant: Shadow-Soft, LLC, Atlanta, GA (US)

(72) Inventors: Tony Stafford, Alpharetta, GA (US); Derrick Sutherland, Atlanta, GA (US)

(73) Assignee: SHADOW-SOFT, LLC, Atlanta, GA (US)

( * ) Notice: Subject to any disclaimer, the term of this patent is extended or adjusted under 35 U.S.C. 154(b) by 368 days.

This patent is subject to a terminal disclaimer.

(21) Appl. No.: 16/781,248

(22) Filed: Feb. 4, 2020

(65) Prior Publication Data

US 2020/0175177 A1 Jun. 4, 2020

Related U.S. Application Data

(63) Continuation of application No. 15/629,401, filed on Jun. 21, 2017, now Pat. No. 10,565,384.

(60) Provisional application No. 62/352,841, filed on Jun. 21, 2016.

(51) Int. Cl.
| | |
|---|---|
| *H04L 29/06* | (2006.01) |
| *G06F 21/57* | (2013.01) |
| *G06F 8/65* | (2018.01) |
| *G06F 8/30* | (2018.01) |
| *G06F 8/77* | (2018.01) |
| *G06F 8/70* | (2018.01) |

(52) U.S. Cl.
CPC ............ *G06F 21/577* (2013.01); *G06F 8/315* (2013.01); *G06F 8/316* (2013.01); *G06F 8/65* (2013.01); *G06F 8/77* (2013.01); *G06F 8/70* (2013.01); *G06F 2221/033* (2013.01)

(58) Field of Classification Search
CPC ..... H04L 63/10; H04L 63/1433; G06F 21/74; G06F 21/577; G06F 21/6281; G06F 2221/033
USPC .......................................................... 726/25
See application file for complete search history.

(56) References Cited

U.S. PATENT DOCUMENTS

| | | | | |
|---|---|---|---|---|
| 7,661,139 | B2* | 2/2010 | Dequevy | H04L 63/145 709/224 |
| 9,021,605 | B2* | 4/2015 | Blue | G06F 12/1491 713/168 |
| 2016/0337400 | A1* | 11/2016 | Gupta | G06F 16/2455 |
| 2017/0213032 | A1* | 7/2017 | Zhang | H04L 29/06 |

\* cited by examiner

*Primary Examiner* — Longbit Chai
(74) *Attorney, Agent, or Firm* — Locke Lord LLP; Tim Tingkang Xia, Esq.

(57) ABSTRACT

A method for automatically enhancing security and fixing security vulnerabilities in the source code of a computer program in an object oriented run time environment includes evaluating the source code file of a monitored computer program. The source code file includes a plurality of class files. Each session includes two or more session segments. A security assessment on each of the plurality of class files is performed to identify one or more potential security issues associated with the plurality of class files. One or more security controls configured to address the identified potential security issues are automatically injected into a source code of one or more class files identified as having potential security issues. The automatically modified source code file of the monitored computer program is deployed to the run-time environment.

20 Claims, 11 Drawing Sheets

DevOps Has Streamlined App Development

| Physical | Virtualized | With DevOps |
|---|---|---|

How to Build an App

1. Have Idea
2. Get Budget
3. Submit hardware acquisition request
4. Wait
5. Get Hardware
6. Rack and Stack Hardware
7. Install Operating System
8. Install Operating System Patches
9. Create user accounts
10. Deploy framework/app server
11. Deploy testing tools
12. Code
13. Test
14. Buy and configure Prod servers
15. Push to Prod
16. Launch
17. Order more servers to meet demand
18. Etc

How to Build an App

1. Have Idea
2. Get Budget
3. Submit VM Request
4. Wait
5. Deploy framework/app server
6. Deploy testing tools
7. Code
8. Test
9. Configure Prod VMs
10. Push to Prod
11. Launch
12. Request VMs to meet Demand
13. Wait
14. Deploy apps to new VMs
15. Etc

How to Build an App

1. Have Idea
2. Get Budget
3. Code
4. Test
5. Launch
6. Automatically Scale

FIG. 3

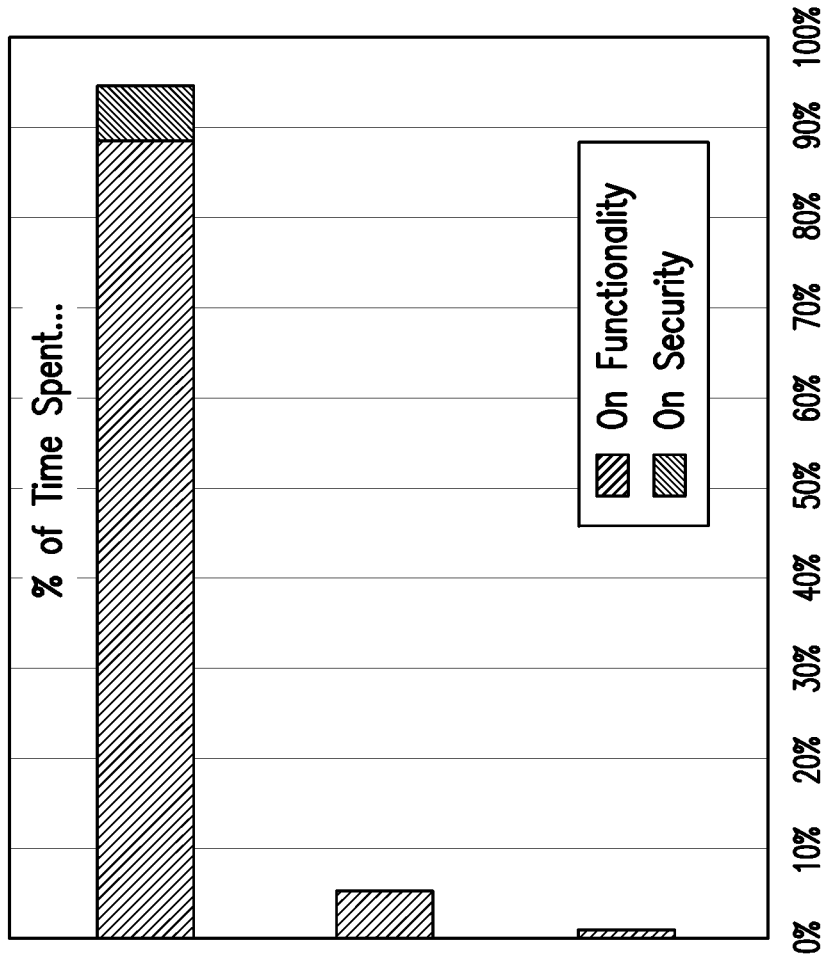
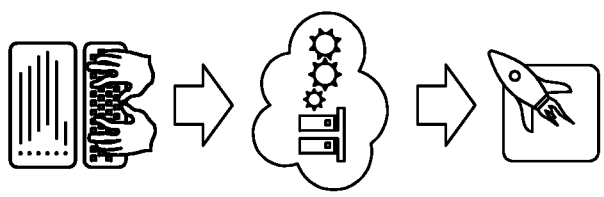
FIG. 8

AUTO-INJECTION OF SECURITY PROTOCOLS

CROSS REFERENCE TO RELATED APPLICATIONS

This application is a continuation application of U.S. patent application Ser. No. 15/629,401, filed Jun. 21, 2017, now allowed, which claims priority to and the benefit of, pursuant to 35 U.S.C. § 119(e), U.S. provisional patent application Ser. No. 62/352,841, filed Jun. 21, 2016, which are incorporated herein in their entireties by reference.

FIELD

The present disclosure relates generally to security protocols, and more particularly to auto-injection of security protocols in an object-oriented run time environment.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Computing devices are widely used in the world and most of them are connected to the internet. However, cyber security is one of the main concerns of the user.

Therefore, an unaddressed need exists in the art to address the aforementioned deficiencies and inadequacies.

SUMMARY

Certain aspects of the present disclosure relate to a web application security monitoring system and automatic injection of security controls.

In accordance with a purpose of the illustrated embodiments, in one aspect, a method for automatically enhancing security and fixing security vulnerabilities in the source code of a computer program in an object oriented run time environment includes evaluating the source code file of a monitored computer program. The source code file includes a plurality of class files. Each session includes two or more session segments. A security assessment on each of the plurality of class files is performed to identify one or more potential security issues associated with the plurality of class files. One or more security controls configured to address the identified potential security issues are automatically injected into a source code of one or more class files identified as having potential security issues. The automatically modified source code file of the monitored computer program is deployed to the run time environment.

Certain aspects of the present disclosure relate to a non-transitory computer readable medium storing computer executable code. In certain embodiments, the computer executable code, when executed at a processor of a computing device, is configured to perform the above described method.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment.

FIG. 3 shows the development system DevOps according to certain embodiments of the present disclosure.

FIG. 8 shows the efficiency of using the DevOps system and the security monitoring system according to certain embodiments of the present disclosure.

DETAILED DESCRIPTION

Figure 1A:
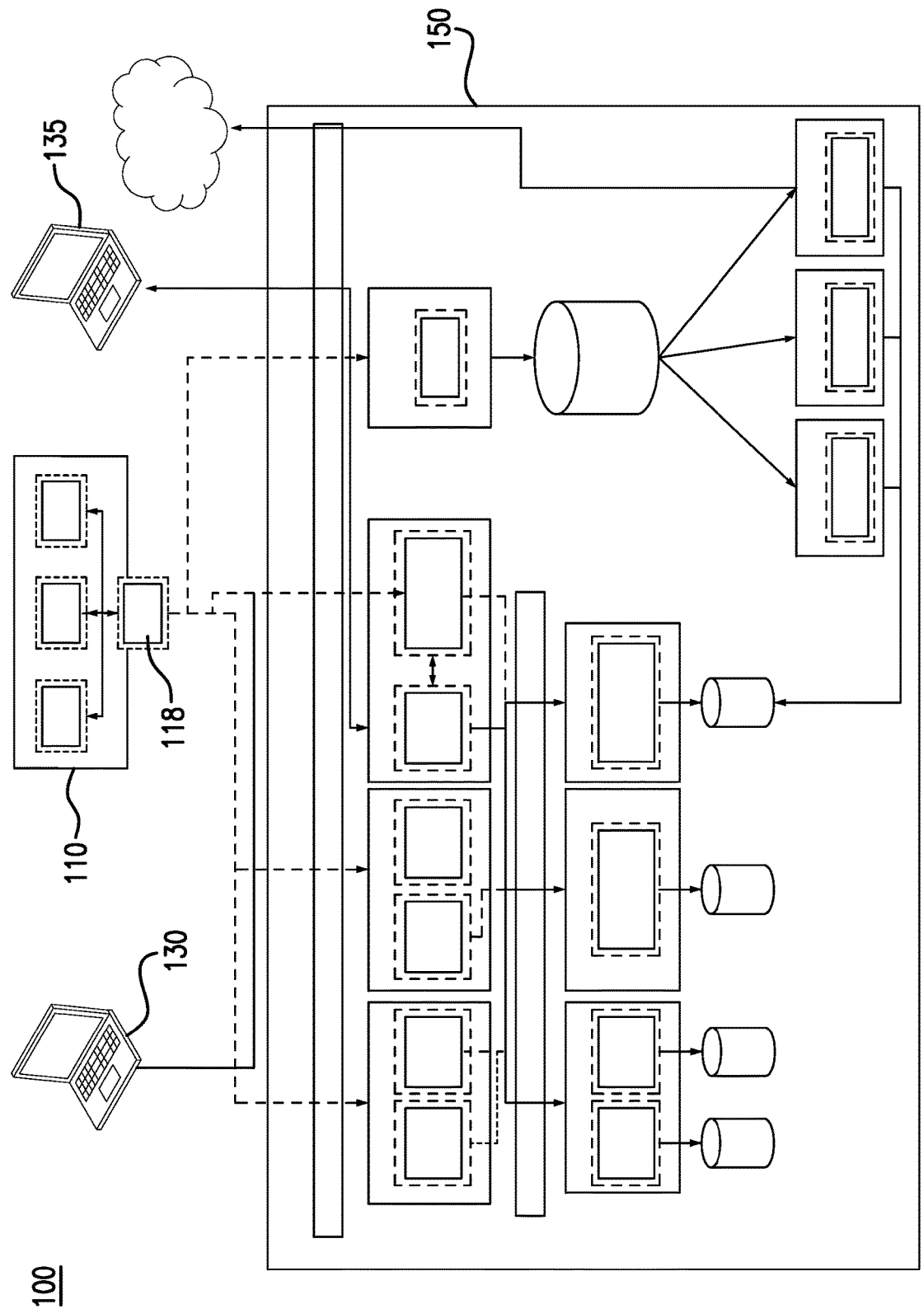
FIG. 1A schematically shows an architecture of the web application security system, according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated. As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, and virtual software components. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

In certain embodiments, the web application security monitoring system includes a computing device, such as a web application server that contains an agent module configured to automatically generate one or more security controls for various software applications. The agent, when being executed in the computing device, provides multiple engines. The engines, in response to receiving a user profile, are configured to control access, authentication, authorization, and auditing of the software applications linked to that user, thus implementing the identification, authentication, authorization and auditing (IAAA) capabilities of the security monitoring system.

Certain aspects of the present disclosure relate to a method for automatically enhancing security and fixing security vulnerabilities in the source code of a monitored computer program in an object-oriented run-time environment. One or more monitored computer programs containing a computer executable set of instructions (e.g., software applications) are related to a user using the agent module described above. One or more application controls of those applications linked to the user are automatically generated by the agent module. This frees the system administrator from the need to configure periodically or regularly the authorities of each user manually.

Figure 1B:
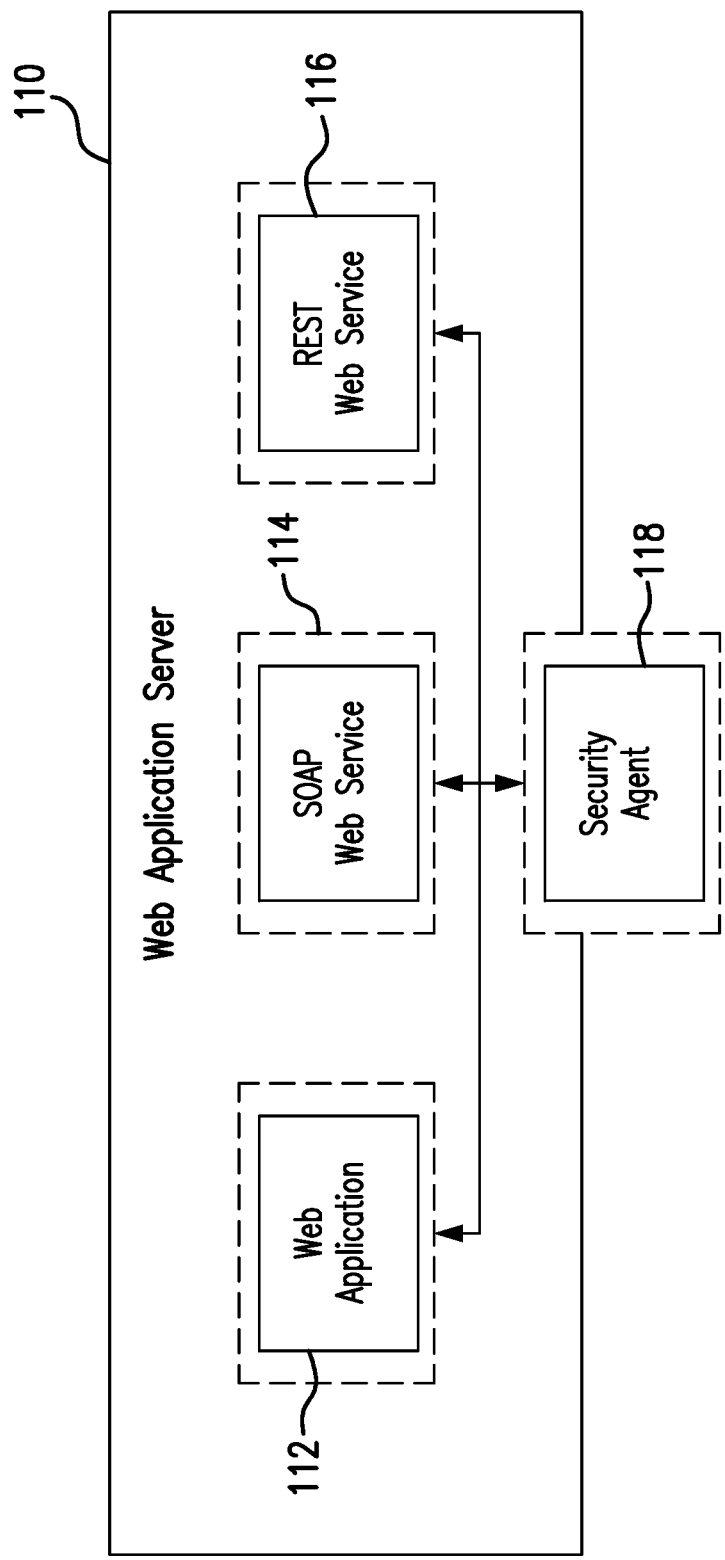
FIGS. 1B-1D are enlarged views of FIG. 1A.
Figure 1C:
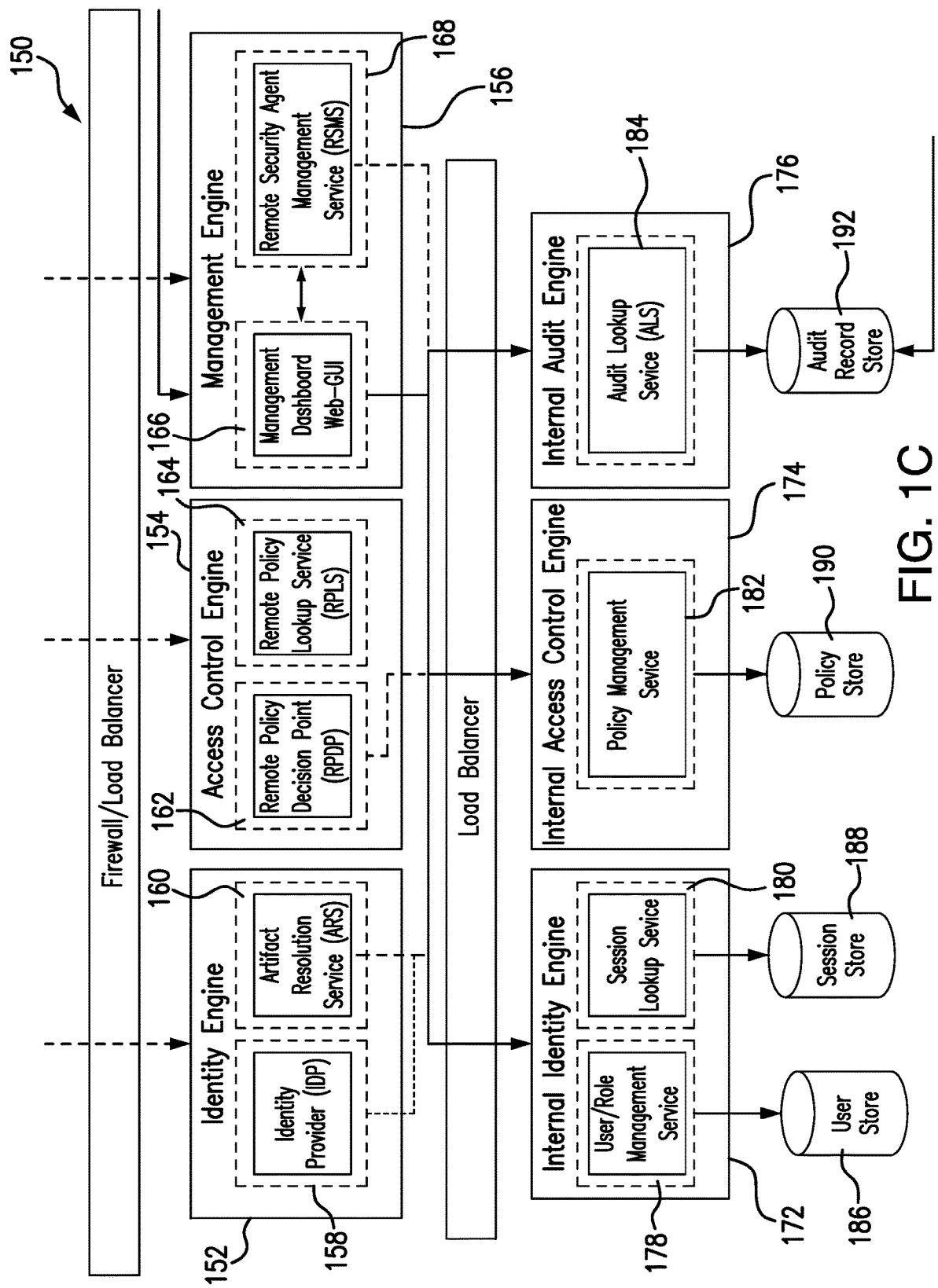
Figure 1D:
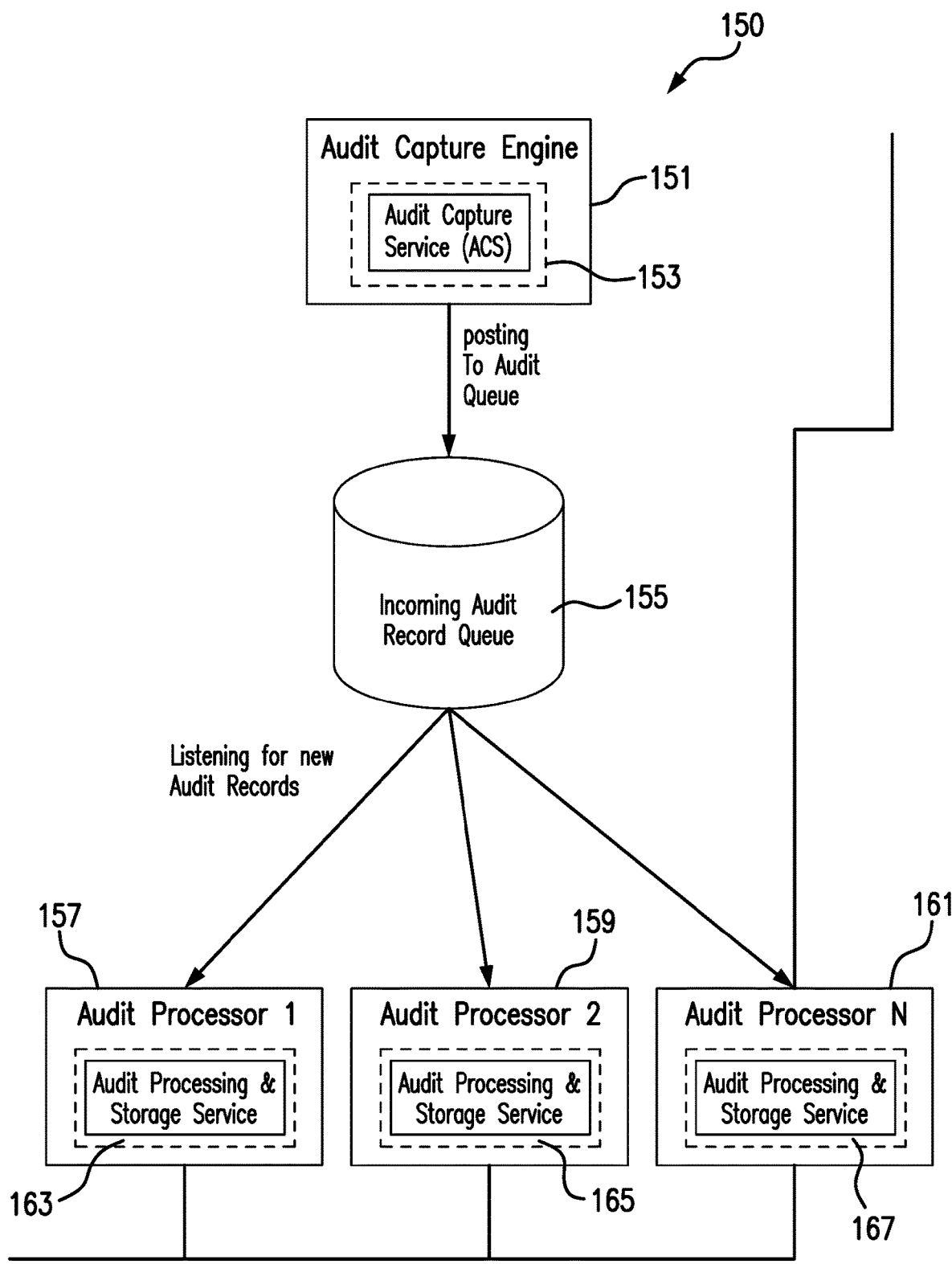

In accordance with the purposes of present disclosure, as embodied and broadly described herein, in certain aspects, the present disclosure relates to a web application security monitoring system and automatic injection of security controls. FIG. 1A schematically shows an architecture of the security monitoring system according to certain embodiments of the present disclosure. FIGS. 1B-1D are enlarged views of FIG. 1A. As shown in FIG. 1A, the system 100 includes a web application server 110, and computing devices 130 and/or 135 accessible by a system administrator.

The web application server 110 may function as a host computer of a security agent 118. In certain embodiments, the web application server 110 may be implemented as a general purpose computer, a specialized server computer, a server farm, a server cluster, software components executed by one or more processors or any other appropriate arrangement and/or combination. In certain embodiments, the web application server 110 may include, but is not necessarily limited to, a processor, a memory, a storage device, and other required memory and I/O modules (not shown). The processor may be a central processing unit (CPU). The processor can execute an operating system (OS) or other applications of the illustrative web application server 110. In some embodiments, the web application server 110 may have more than one CPU, such as two CPUs, four CPUs, eight CPUs, or any suitable number of CPUs. The memory can be a volatile memory, such as the random-access memory (RAM), for storing the data and information during the operation of the web application server 110. The storage device is a non-volatile data storage media for storing the OS (not shown) and other applications hosted by the web application server 110. Examples of the storage device may include non-volatile memory such as flash memory, memory cards, USB drives, hard drives, floppy disks, optical drives, or any other types of data storage devices. In certain embodiments, the web application server 110 may have multiple storage devices, which may be identical storage devices or different types of storage devices, and the applications running on the web application server 110 may be stored in one or more of the storage devices of the web application server 110.

In certain embodiments, as shown in FIG. 1B, the application server 110 may host at least one web application 112, Simple Object Access Protocol (SOAP) web service 114, representational state transfer (REST) web service 116, and the security agent 118 in communication with at least one of the web application 112, SOAP web service 114, and REST web service 116. The web application 112 may include an explicit declaration in an application manifest file. The application manifest file contains information about the web application 112, such as its name, version, what permissions it needs, what functions or operations it performs, etc. The manifest file may also contain an explicit statement indicating that the web application 112 accesses a particular external library. Many web services support SOAP, an XML-based protocol for programmatically issuing requests to, and receiving responses from, client applications. The application server 110 may provide various application program interfaces (APIs) via the SOAP web service 114. REST web service 116 typically employs a service-oriented approach that is invoked by a REST uniform resource locator (URL) (e.g., from a browser, or a client application) to invoke the functionality of an application. The REST services are reusable functional components that are used to create application functionality. The REST web service 116 may represent the functionality that is invoked as part of a REST application programming interface (API) call. The REST API may include a URL, and the types of parameters and values that are passed from the URL to the REST service 116 such that the REST service performs the function that is intended. The service-orientation for an application typically facilitates integration with third-party services to create more complex applications.

The security agent 118 associated with the web application server 110 may be stored in the storage of the web application server 110. The security agent 118, when being executed in the memory by one or more processors of the web application server 110, provides security services 150. The security services 150, as shown in FIGS. 1A, 1C, and 1D, include multiple engines. Each of the engines may be implemented in at least one physical computing device or at least one virtual machine, so as to achieve load balance.

In various embodiments, a flexible web application security monitoring system may comprise a cloud-based or on-premise centralized web application security management system capable of automatic injection of security controls. The security management system, including the security agent application 118 can be managed via web Graphical User Interface (GUI), Command Line Interface (CLI), RESTful interface, or mobile phone application. In one embodiment of the present application, as shown in FIG. 1C, the provided security services 150 may include an identity engine 152, access control engine 154 and management engine 156.

The identity engine 152 may further comprise an IdentityProvider (IDP) module 158 and an Artifact Resolution Service (ARS) module 160. The IDP module 158 specifies a mechanism for authenticating an identity of a client involved in an initiation dialogue. This mechanism is described in section 8, "Identity," in the "WebRTC 1.0: Real-time Communication Between Browsers" document available online at, e.g., http://http://w3c.github.io/webrtc-pc. The ARS module 160 provides a mechanism by which Security Assertion Markup Language (SAML) protocol messages may be passed by reference using a small, fixed-length value called an artifact. The artifact receiver uses the Artifact Resolution Protocol (ARP) to ask the message creator to dereference the artifact and return the actual protocol message. The artifact is typically passed to a message recipient using one SAML binding (e.g. HTTP Redirect) while the resolution request and response take place over a synchronous binding, such as SOAP.

According to an embodiment of the present invention, the identity engine 152 may be communicatively coupled to an internal identity engine 172. The internal identity engine 172 may comprise a user/role management service module 178 and a session lookup service module 160. User access to web applications can be based on verifiable user relationships across different business enterprises. The user store storage unit 186 stores user's information (e.g., role policy) related to a rule used to determine the role assigned to a user. For example, the role policy includes definitions of rules used to determine a role, in the service of the web application server 110, assigned to the user authenticated by the identity engine 154, a relationship between the web application server 110 and another server, and a role, in the service of the web application server 110, assigned to a user authenticated by another server. It should be noted that a classical role-based access control model is only one example of access control models that can be supported by the disclosed system. In alternative embodiments, an access control model may comprise any of an attribute-based, policy-based or a hybrid model. The user/role management service is used to store/retrieve information into/from the user store storage unit 186. The session information is stored in a session store storage unit 188 separate from the user store 186. The session lookup service module 180 is used by the internal identity engine 172 to store/retrieve session information to/from the session store storage unit 188.

The access control engine 154 may further comprise a Remote Policy Decision Point (RPDP) module 162 and a Remote Policy Lookup Service (RPLS) 164. According to embodiments of the present invention, the access control engine 154 may employ one of the existing general-purpose Access Control (AC) languages that have the richness to express fine-grained conditions and conditions which depend on external data. In one embodiment, the access control engine 154 may use an Explicit and Deterministic Access Control Markup Language (EDACML). EDACML is a deterministic access control language, increasing its clarity and predictability. EDACML is designed to manage the authorization of many web applications and services simultaneously. Additionally, EDACML is capable of handling a large number of policies. In an alternative embodiment, the access control engine 154 may use an Extensible Access Control Markup Language (XACML). XACML is the subject of standardization work in a Technical Committee of the Organization for the Advancement of Structured Information Standards (see http://www.oasis-open.org). A policy encoded with XACML consists of functional expressions on the attribute values in the request and the return value of the policy is one of Permit, Deny, Not Applicable, or Indeterminate. An XACML policy can apply to many different situations, that is, different subjects, resources, actions and environments and may give different results for them. The XACML specification defines how such a request is evaluated against the policy, particularly what policy attributes are to be evaluated or, at least, which values are required to exist for a successful evaluation to result. Key characteristics of this evaluation process are that the request (the query against the policy) must describe the attempted access to a protected resource fully. In practice, it may be that the request is constructed in multiple stages by different components, so that a PEP (Policy Enforcement Point) provides only some initial attribute values and the RPDP module 162 can fetch more values from remote sources as they are needed. However, this does not change the situation that the policy cannot be evaluated unless all attribute values which describe the attempted access and are referenced by the policy are known, either directly, or through multi-stage lookup from one or more remote attribute sources.

The access control engine 154 may further include the RPLS module configured to retrieve at least one policy profile associated with a client device and determine whether the at least one policy profile describes an effective policy for the application. The access control engine 154 may also include a local cache configured to maintain a list of one or more recently requested policy profiles.

According to an embodiment of the present invention, the access control engine 154 may be communicatively coupled to an internal access control engine 174. The internal access control engine 174 may comprise a policy management service module 182. The policy management service 182, in an embodiment, is a module configured to manage policies (stored in the policy store storage unit 190) on behalf of users of the web application server 110. The policy management service 182 may include an interface that enables access control engine 154 to submit requests related to the management of policy. Such requests may, for instance, be requests to add, delete, change or otherwise modify policy for the web application or for other administrative actions, such as providing an inventory of existing policies and the like. The policy management service 182 may also interface with other services to enable the services to determine whether the fulfillment of a pending request is allowable according to policy corresponding to the user for which the request was made. For example, when a service receives a request, the service (if it has not locally cached such information) may transmit information about the request (and/or the request itself) to the access control engine 154, which may analyze policies for the user to determine whether existing policy of the user allows fulfillment of the request and provide information to the service according to the determination.

The access management engine 156 may further comprise a management dashboard web-GUI module 166 and a Remote Security agent Management Service (RSMS) 164. The dashboard web-GUI module 166 implements the GUI to essentially enable access to the security management system functionality described herein using the GUI. The management engine 156 can include a management agent (RSMS 168) to monitor activity at the web application server 110 and communicate information describing the monitoring to a remote security management system. In addition, the RSMS module 168 can enable remote access to the security management system.

According to an embodiment of the present invention, the management engine 156 may be communicatively coupled to an internal audit engine 176. The internal audit engine 176 may comprise an Audit Lookup Service (ALS) module 182 that facilitates intelligent auditing of security log records stored in the audit record storage unit 192. As shown in FIG. 1D, the provided security services 150 may further include an audit capture engine 151 further comprising an Audit Capture Service (ACS) module 153. The ACS module 153 collects security event log data in a form of audit records based on the pre-defined rules, to create a complete picture of web application server 110 usage. According to an embodiment of the present invention, the ACS module 153 may employ an incoming audit record queue 155 for temporary storage of captured audit records. As shown in FIG. 1D, a plurality of audit processors 157-161 comprising respective audit processing and storage service modules 163-167, which are clients to the audit capture service module 153, fetch audit records from the incoming audit record queue 155, process the audit records, and send the processed audit records to the audit record storage unit 192 for long-term storage. The processing of audit records by the audit processing and storage service modules 163-167 may include operations such as converting audit data from binary to text format, or otherwise processing audit data according to specifications and protocols required or preferred by the security management system.

According to an embodiment of the present invention, the management engine 156 may provide an overview of all web applications and services currently being managed by security agents. Such overview may include, but is not limited to the following features: an index of all applications and services monitored by security agents 118; an index of all methods associated with the aforementioned applications and services; and a functional map depicting the interrelationships of applications and services monitored by the security agents 118 (web GUI and mobile phone application only).

The management engine 156 interfaces in cooperation with the identity engine 152 and access control engine 154 offer a mechanism to modify access control rules associated with each application and service. The disclosed security management system's fine-grained-access-control allows administrators to define and apply who can access what, from where and when they are permitted in real-time to federated/distributed systems.

Additionally, the management engine 156 enable user, role, and audit record management. The user and role management capability within the centralized management engine 156 includes at least the following:

Add/edit/delete user identity/profile;

Add/edit/delete user roles; and

Add/edit/delete user attributes.

The internal audit engine 176 provides a near-real-time search engine (ALS 184) to search security related audit records associated with every system monitored by the security agent 118. Additionally, the audit processor 157-161 provide the unique capability to intelligently scan for common security threats, including but not limited to: common network security flaws in a source code; web application network security attacks; and anomalies in user behavior.

When a security threat is detected, an administrator can elect to be notified via one (or more) of many communication channels (centralized management portal, SMS, Email, Messaging Client, etc).

According to embodiments of the present invention, as described in greater detail below, the security agents 118 are responsible for injecting security controls at runtime and without human intervention. The aforementioned cyber security controls include the following: Single-Sign-On (SSO) of Web Applications and Web Services; Single-Log-Out (SLO) of Web Applications and Web Services; HTTP Session Management; Web Applications, Web Services and Class/Method Access Control; Security Related Audit Capture; SQL Injection Protection method; and Cross-site Scripting (XSS) Protection method.

The security agents 118 also concurrently gather information related to all of the aforementioned security controls and sends all corresponding data periodically to the centralized management portal for user review. This in-turn allows end-users to easily manage access control policies, review security related problems and audit records alike.

Figure 2:
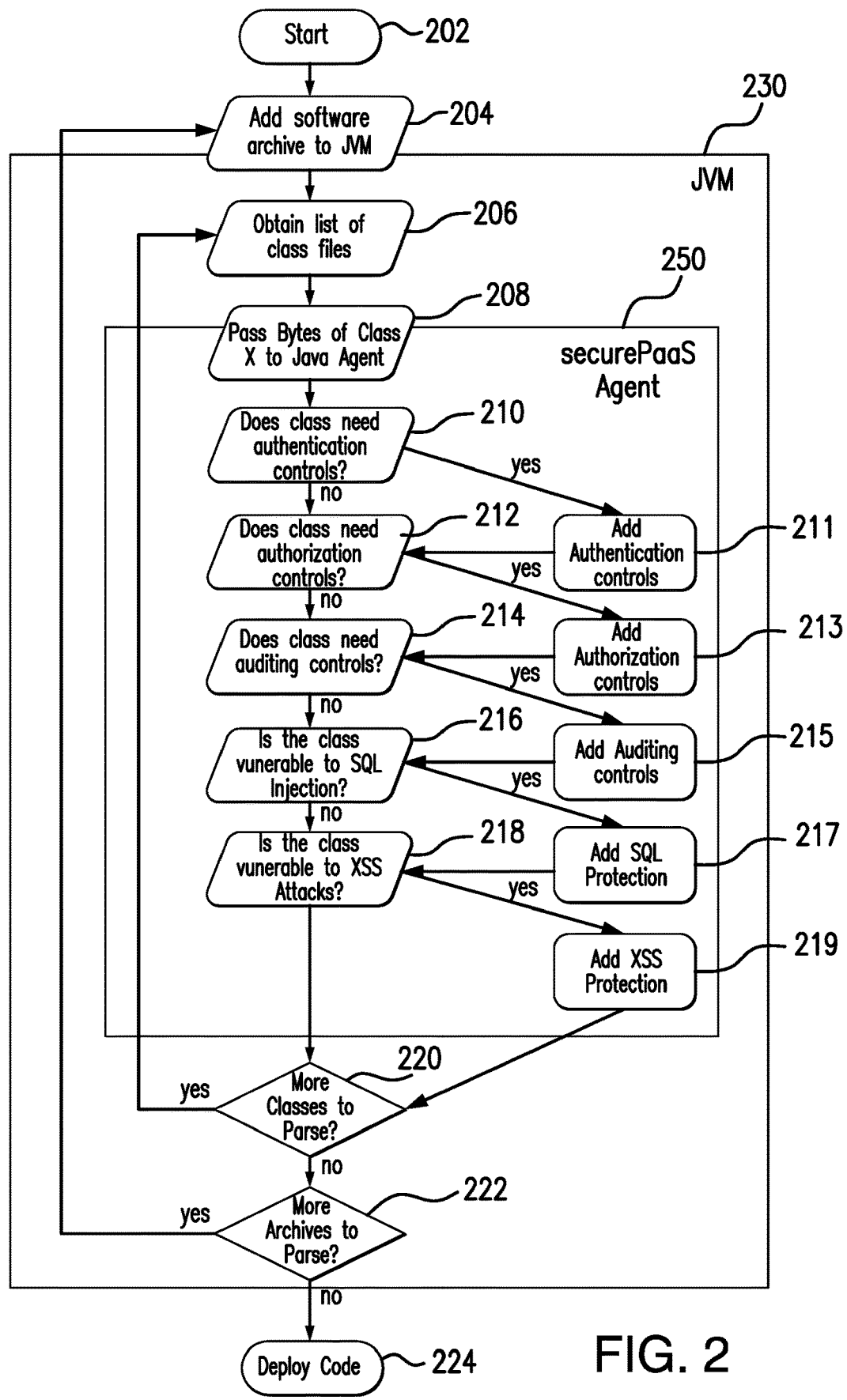
FIG. 2 schematically shows a workflow of the steps performed by the security agent, according to certain embodiments of the present disclosure.

In certain aspects, the present disclosure relates to a method of providing an automatic injection of cyber security controls. FIG. 2 schematically shows a workflow of the steps performed by the security engine 118. As shown in FIG. 2, the method can be performed under a Java virtual machine (JVM). However, embodiments of the present invention are not limited thereto. In certain embodiments, the functionality described herein is suitable for any object-oriented runtime environment, such as Java, C++, C #, Python, PHP, Ruby, Perl, Delphi, Objective-C, Swift, Common Lisp, and Smalltalk.

Before turning to description of FIG. 2, it is noted that the flow diagram shown therein is described, by way of example, with reference to components shown in FIGS. 1A-1-D, although these operational steps may be carried out in any system and are not limited to the scenario shown in the aforementioned figure. Additionally, the flow diagram in FIG. 2 illustrates an example in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

As shown in FIG. 2, at step 202, the security agent 118 starts the method, and at step 204, the security agent 118 adds a software archive of different monitored software or applications to the JVM.

At step 206, the security agent 118 evaluates the source code file of a monitored computer program (software or application). The source code file comprises a plurality of class files.

After that, the security agent 118 performs a cycle of steps 208 to 219. In the cycle, files of one class X from the list of classes are passed to the security agent 118 to perform a security assessment of each class. Such security assessment includes identifying one or more potential security issues associated with an assessed class file. If the class is identified as having potential security issues, the security agent 118 automatically injects into a source code of the class file one or more security controls configured to address the identified potential security issues.

More specifically, at step 210, the security agent 218 determines if the assessed class needs authentication controls. In response to determining that the authentication controls are needed, at step 211, the security agent 218 adds the authentication controls to the source code of the class, and the process goes to step 212. If the authentication controls are not needed, the security agent 218 goes directly from step 210 to step 212.

At step 212, the security agent 218 determines if the assessed class needs authorization controls. If yes, at step 213, the security agent 218 adds the authorization controls to the source code of the class, and the process goes to step 214. If the authorization controls are not needed, the security agent 218 goes directly from step 212 to step 214.

At step 214, the security agent 218 determines if the assessed class needs auditing controls. If yes, at step at step 215, the security agent 218 adds the auditing controls to the source code of the class, and the process goes to step 216. If the auditing controls are not needed, the security agent 218 goes directly from step 214 to step 216.

At step 216, the security agent 218 determines if the assessed class is vulnerable to an SQL injection attack. If yes, at step 217, the security agent 218 adds an SQL protection method to the source code of the class, and the process goes to step 218. If the class is not vulnerable to the SQL injection attack, the security agent 218 goes directly from step 216 to 218.

At step 218, the security agent 218 determines if the class is vulnerable to XSS attacks. If yes, at step 219 the security agent 218 adds a XSS protection method to the source code of the class. According to an embodiment of the present invention, at this point the cycle ends, and the security agent 218 goes to step 220.

At step 220, the security agent 218 determines if there are more classes in the archive that need to be parsed. If yes, the security agent 218 goes back to step 206, and another class is processed according to the steps 208-219.

Once all the classes are processed in the archive, that is, there are no more classes to parse at step 220, then the security agent 218 proceeds from step 220 to step 222.

At step 222, the security agent 218 determines whether more archives are available to parse. If yes, the security agent 218 goes back to step 204, and performs the process from step 204 to step 222 yet again.

After all of the archives are processed, that is, the security engine 218 proceeds to step 224. The modified code is deployed to a run-time environment by the security agent 218 in step 224, so that the automatic modifications performed in the above steps become effective in a run-time environment.

By the above process shown in FIG. 2, automatic secure means have been achieved using the security agent, for example for a user. Therefore, the administrator does not need to configure the authority of the user in regard to variety of monitored software applications.

In another aspect, the present disclosure relates to a non-transitory computer readable medium storing computer executable code. In certain embodiments, the computer executable code may be at least a part of a firmware or software of the web application server 110 as described above. The computer executable code, when being executed, may perform one of a method described above. In certain embodiments, the non-transitory computer readable medium may include, but not limited to, non-volatile memory of the web application server 110 as described above, or any other storage media of the web application server 110.

Figure 4:
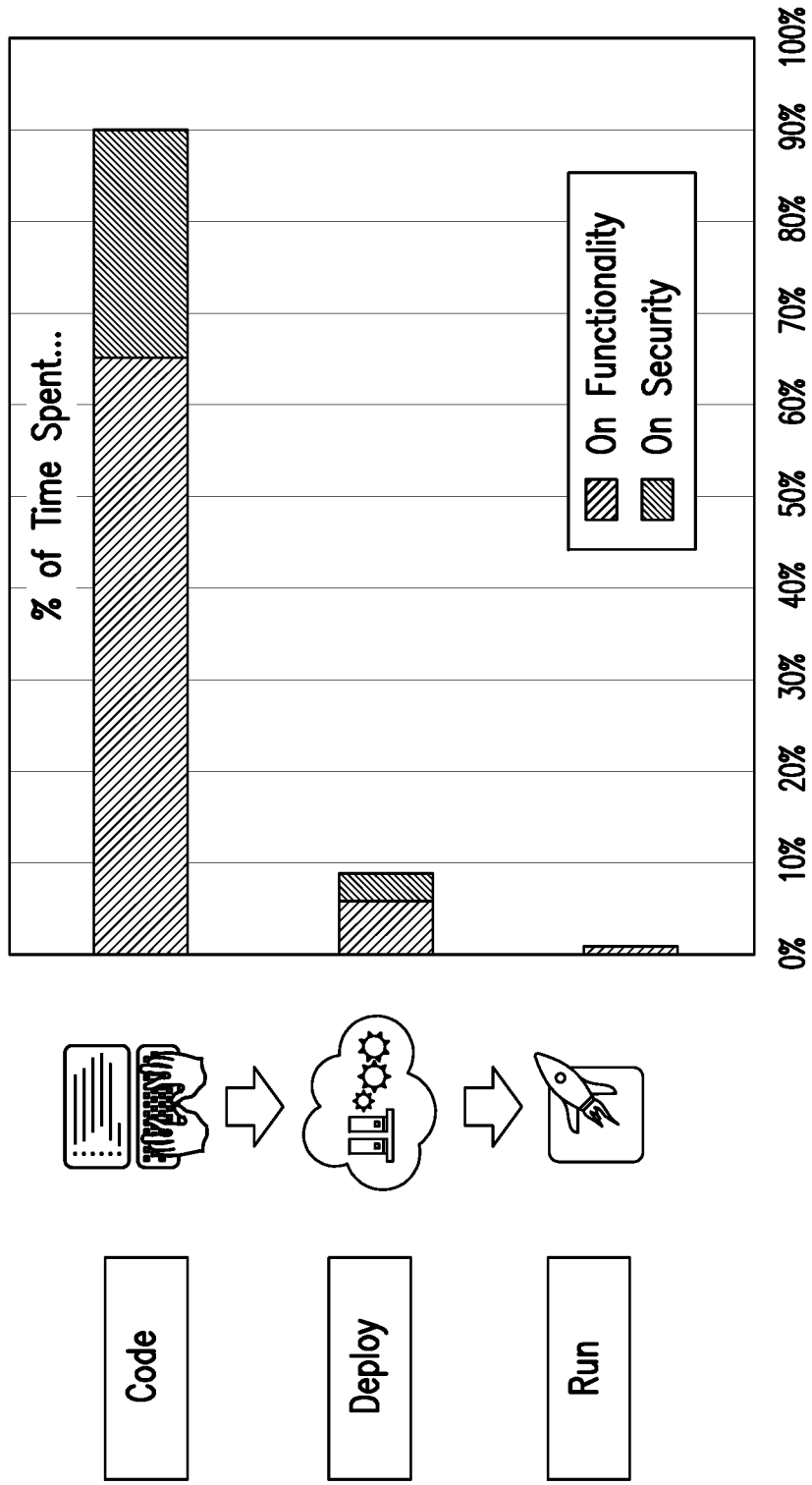
FIG. 4 shows the efficiency of using the DevOps system of the present disclosure comparing to other available systems.
Figure 5:
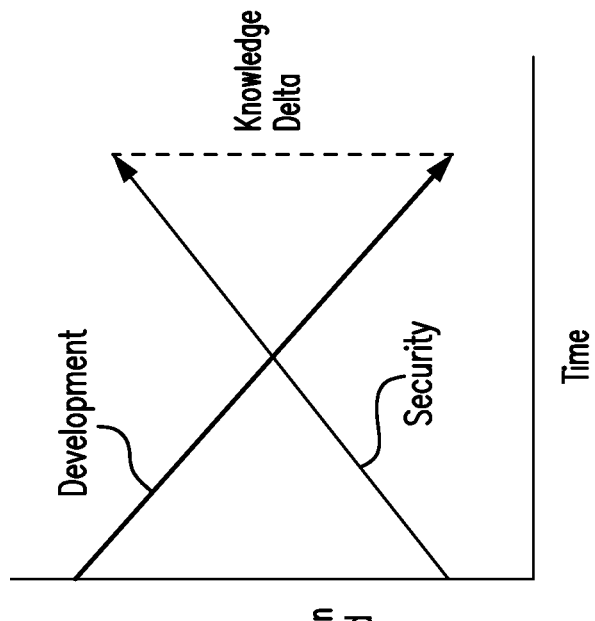
FIG. 5 shows possible problem in the DevOps system according to certain embodiments of the present disclosure.

In one aspect, as shown in FIG. 3, the present disclosure provides an application development system DevOps, which has obvious advantages over physical or virtualized development environment. FIG. 4 shows the efficiency of using the DevOps system of the present disclosure. Although the DevOps has advantages over other available development environment, there is still problems as shown in FIG. 5.

In certain embodiments, the security agent according to certain embodiments of the present disclosure is able to solve the possible problems in the DevOps.

Figure 6:
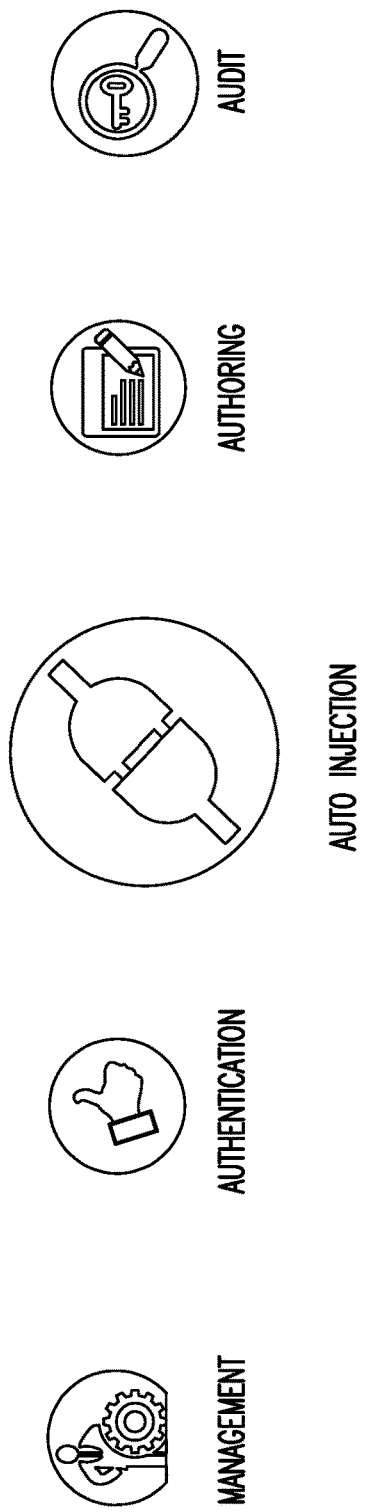
FIG. 6 shows a framework of the security monitoring system according to certain embodiments of the present disclosure.
Figure 7:
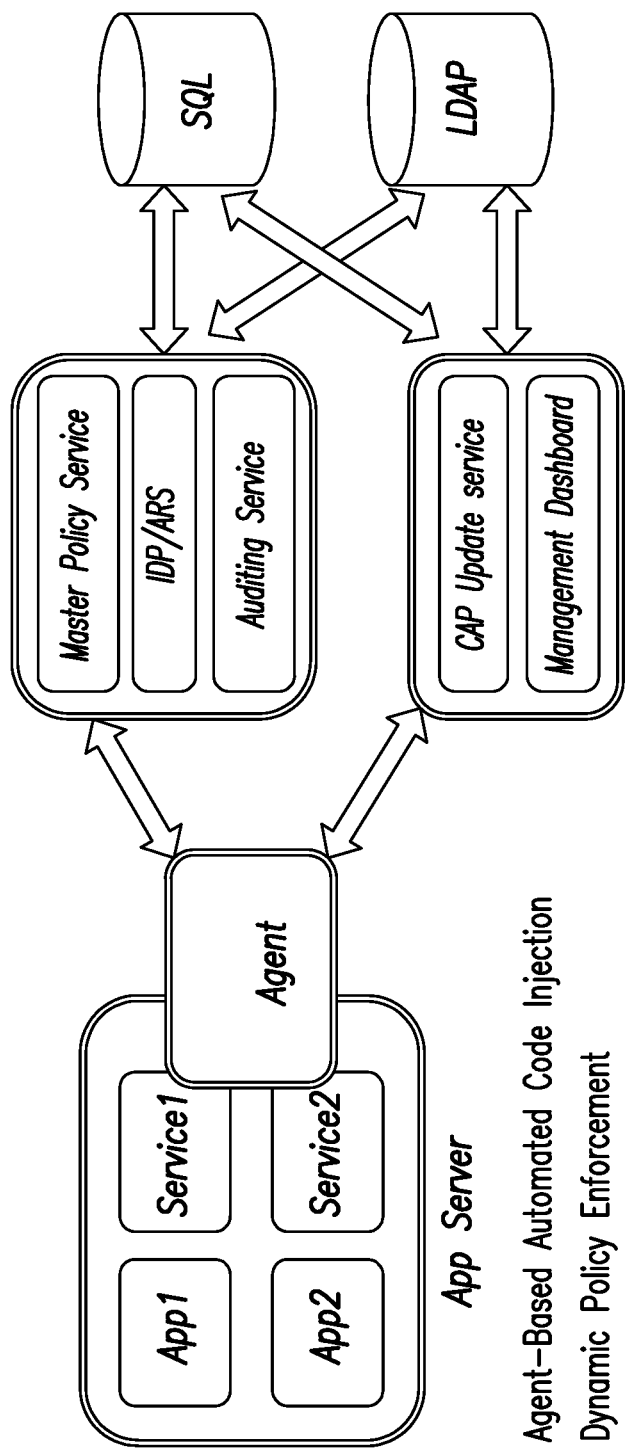
FIG. 7 shows a system architecture of the security monitoring system according to certain embodiments of the present disclosure.

FIG. 6 shows a framework of the security agent according to certain embodiments of the present disclosure, and FIG. 7 shows system architecture of the security agent according to certain embodiments of the present disclosure. By combining security agent with DevOps, as shown in FIG. 8, the time spent on security is greatly reduced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method for automatically enhancing security and fixing security vulnerabilities in the source code of a computer program in an object-oriented run-time environment, comprising steps of:
    evaluating the source code file of a monitored computer program for potential security issues, the source code file comprising a plurality of class files containing byte codes, that are produced by a compiler from the source code file and executed in a virtual environment;
    performing a security assessment on the plurality of class files based upon attributes of each such class file to identify one or more potential security issues of the plurality of class files to fix the security vulnerabilities in the source code file in a level of a web application in the object-oriented run-time environment;
    utilizing byte code injection to add in web security controls against the web application by automatically injecting a source code for one or more security controls configured to address the identified potential security issues into the source code of one or more class files identified as having attributes that raise potential security issues; and
    causing the automatically modified source code file of the monitored computer program to be deployed to the object-oriented run-time environment.

2. The method of claim 1, wherein the step of performing the security assessment further comprises determining whether network authentication controls are required for an assessed class file and wherein the step of automatically injecting one or more security controls further comprises automatically injecting one or more authentication controls into the source code of the assessed class file.

3. The method of claim 1, wherein the step of performing the security assessment further comprises determining whether authorization controls are required for an assessed class file and wherein the step of automatically injecting one or more security controls further comprises automatically injecting one or more authorization controls into the source code of the assessed class file.

4. The method of claim 1, wherein the step of performing the security assessment further comprises determining whether auditing controls are required for an assessed class file and wherein the step of automatically injecting one or more security controls further comprises automatically injecting one or more auditing controls into the source code of the assessed class file.

5. The method of claim 1, wherein the step of performing the security assessment further comprises determining SQL injection attack vulnerability for an assessed class file and wherein the step of automatically injecting one or more security controls further comprises automatically injecting SQL injection attack safety protection method into the source code of the assessed class file.

6. The method of claim 1, wherein the step of performing the security assessment further comprises determining cross-site scripting (XSS) attack vulnerability for an assessed class file and wherein the step of automatically injecting one or more security controls further comprises automatically injecting XSS attack safety protection method into the source code of the assessed class file.

7. The method of claim 1, wherein the step of performing a security assessment on each of the plurality of class files further comprises generating an index file comprising one or more index links to one or more methods associated with the plurality of class files.

8. The method of claim 4, wherein the step of determining whether auditing controls are required for an assessed class file further comprises searching a plurality of log files and searching a plurality of audit records associated with the monitored computer program.

9. The method of claim 1, further comprising sending results of the performed security assessment to a user.

10. A computer system, comprising:
    a non-transitory memory device for storing computer readable program code; and
    at least one hardware processor in communication with the memory device, the hardware processor being operative with the computer readable program code to:
    evaluate the source code file of a monitored computer program, the source code file comprising a plurality of class files containing byte codes, that are produced by a compiler from the source code file and executed in a virtual environment;
    perform a security assessment on each of the plurality of class files to identify one or more potential security issues associated with the plurality of class files based upon attributes of each class file to fix the security vulnerabilities in the source code file in a level of a web application in the object-oriented run-time environment;
    utilize byte code injection to add in web security controls against the web application by automatically injecting into a source code of one or more class files, identified as having potential security issues, one or more security controls configured to address the identified potential security issues; and
    cause the automatically modified source code file of the monitored computer program to be deployed to a run-time environment.

11. The computer system of claim 10, wherein perform the security assessment further comprises determine whether network authentication controls are required for an assessed class file and wherein automatically inject one or more security controls further comprises automatically inject one or more authentication controls into the source code of the assessed class file.

12. The computer system of claim 10, wherein perform the security assessment further comprises determine whether authorization controls are required for an assessed class file and wherein automatically inject one or more security controls further comprises automatically inject one or more authorization controls into the source code of the assessed class file.

13. The computer system of claim 10, wherein perform the security assessment further comprises determine whether auditing controls are required for an assessed class file and wherein automatically inject one or more security controls further comprises automatically inject one or more auditing controls into the source code of the assessed class file.

14. The computer system of claim 10, wherein perform the security assessment further comprises determine SQL injection attack vulnerability for an assessed class file and wherein automatically inject one or more security controls further comprises automatically inject SQL injection attack safety protection method into the source code of the assessed class file.

15. The computer system of claim 10, wherein perform the security assessment further comprises determine cross-site scripting (XSS) attack vulnerability for an assessed class file and wherein automatically inject one or more security controls further comprises automatically inject XSS attack safety protection method into the source code of the assessed class file.

16. The computer system of claim 10, wherein perform a security assessment on each of the plurality of class files further comprises generate an index file comprising one or more index links to one or more methods associated with the plurality of class files.

17. The computer system of claim 13, wherein determine whether auditing controls are required for an assessed class file further comprises search a plurality of log files and search a plurality of audit records associated with the monitored computer program.

18. One or more non-transitory computer-readable storage media, having computer-executable instructions embodied thereon, wherein when executed by at least one hardware processor, the computer-executable instructions cause the hardware processor to:
  evaluate the source code file of a monitored computer program, the source code file comprising a plurality of class files;
  perform a security assessment on each of the plurality of class files to identify one or more potential security issues associated with the plurality of class files based upon attributes of each class file containing byte codes, that are produced by a compiler from the source code file to fix the security vulnerabilities in the source code file in a level of the web application in an object-oriented run-time virtual environment;
  utilize byte code injection to add in web security controls against the web application by automatically injecting into a source code of one or more class files, identified as having potential security issues, one or more security controls configured to address the identified potential security issues; and
  cause the automatically modified source code file of the monitored computer program to be deployed to a run-time environment.

19. The non-transitory computer-readable storage media of claim 18, wherein perform the security assessment further comprises determine whether network authentication controls are required for an assessed class file and wherein automatically inject one or more security controls further comprises automatically inject one or more authentication controls into the source code of the assessed class file.

20. The non-transitory computer-readable storage media of claim 18, wherein perform the security assessment further comprises determine whether authorization controls are required for an assessed class file and wherein automatically inject one or more security controls further comprises automatically inject one or more authorization controls into the source code of the assessed class file.

* * * * *